(12) United States Patent
Mikami et al.

(10) Patent No.: US 6,825,938 B2
(45) Date of Patent: Nov. 30, 2004

(54) FILM THICKNESS MEASURING METHOD AND STEP MEASURING METHOD

(75) Inventors: Toru Mikami, Fujisawa (JP); Toshihiko Kikuchi, Kurokawa-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 10/095,705

(22) Filed: Mar. 13, 2002

(65) Prior Publication Data

US 2002/0163652 A1 Nov. 7, 2002

(30) Foreign Application Priority Data

Mar. 13, 2001 (JP) ........................................ 2001-071102

(51) Int. Cl.$^7$ .............................................. G01B 11/28
(52) U.S. Cl. ................ 356/630; 356/237.4; 250/559.27
(58) Field of Search ................. 356/630–632, 356/369, 503, 504, 485, 237.4, 237.5; 250/559.27

(56) References Cited

U.S. PATENT DOCUMENTS 6,025,596 A   2/2000   Shirai et al. ........... 250/339.11
6,166,819 A   12/2000  Schnabel ..................... 356/504

FOREIGN PATENT DOCUMENTS

JP   7-280520     10/1995
JP   2000-310512  11/2000

Primary Examiner—Richard A. Rosenberger
Assistant Examiner—Vincent P. Barth
(74) Attorney, Agent, or Firm—Finnegan, Henderson, Farabow, Garrett & Dunner, L.L.P.

(57) ABSTRACT

A film thickness measuring method comprises projecting white light onto a wafer with a film to be measured and sensing a first reflected light intensity from the wafer, determining the first reflected light intensity in the form of a first light intensity profile with wavelength as the abscissa axis and light intensity as the ordinate axis, projecting the white light onto a reference sample having the same structure as that of the underlying layer below the film and sensing a second reflected light intensity from the sample, determining the second reflected light intensity in the form of a second light intensity profile similarly to the first light intensity profile, calculating a normalized light intensity profile by dividing the first light intensity profile by the second light intensity profile, and calculating the film thickness of the film to be measured from the normalized light intensity profile.

12 Claims, 6 Drawing Sheets

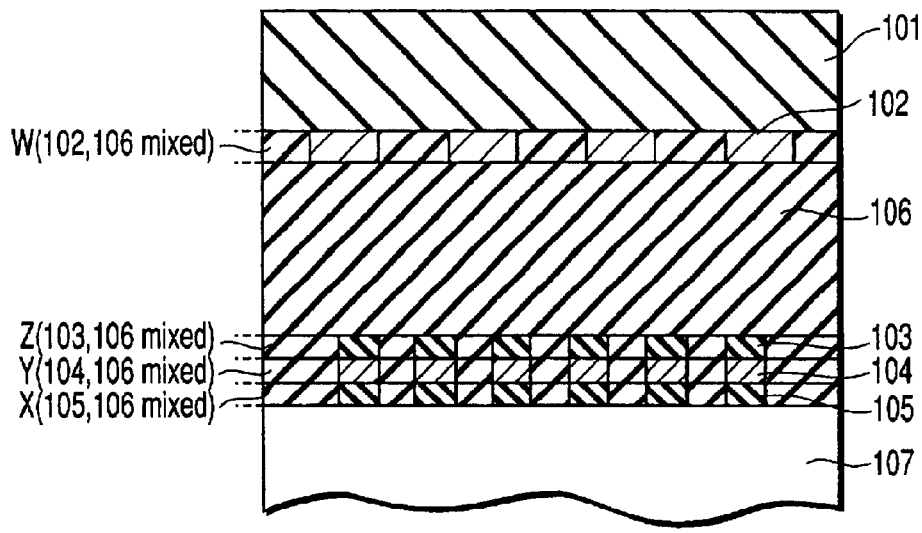
F I G. 1

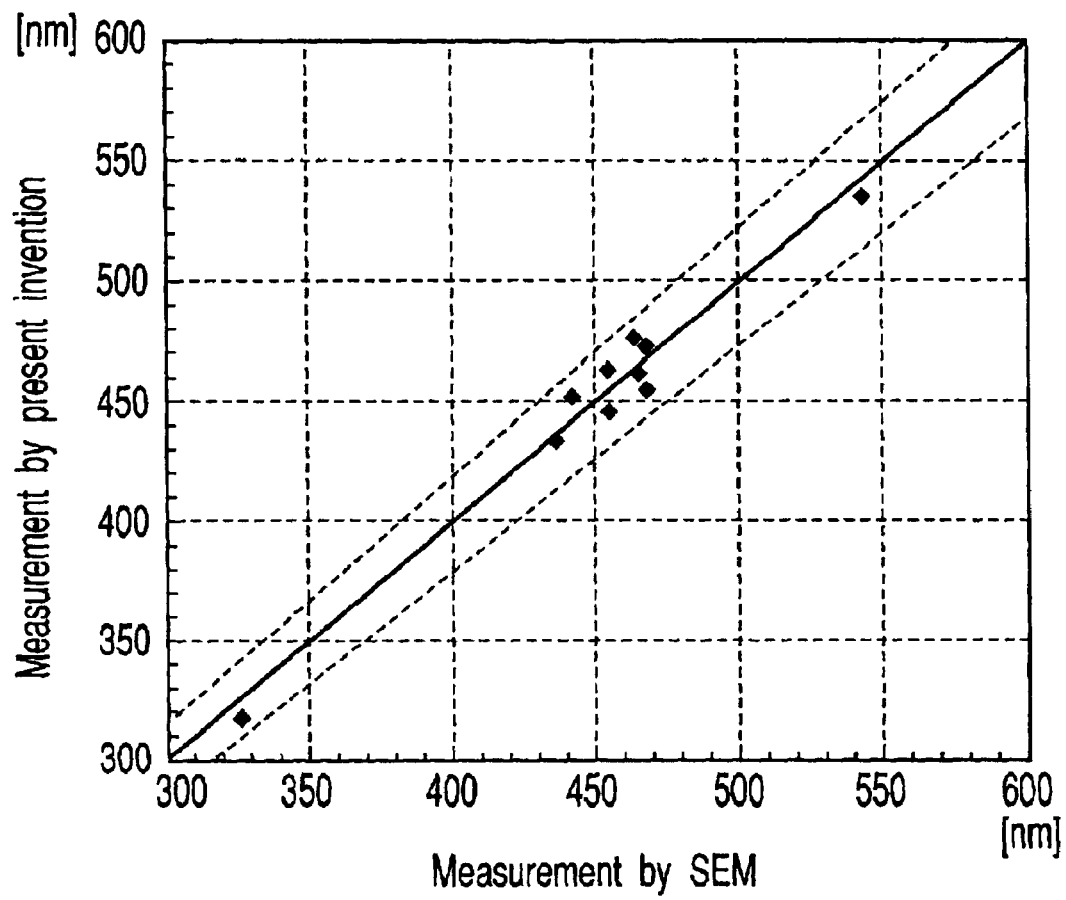
F I G. 11

FILM THICKNESS MEASURING METHOD AND STEP MEASURING METHOD

CROSS-REFERENCE TO RELATED APPLICATIONS

This application is based upon and claims the benefit of priority from the prior Japanese Patent Application No. 2001-071102, filed Mar. 13, 2001, the entire contents of which are incorporated herein by reference.

BACKGROUND OF THE INVENTION

1. Field of the Invention

This invention relates to a method of and apparatus for measuring the thickness of a film formed on multilayer wiring or the like of a semiconductor wafer and a method of and apparatus for measuring a step height formed in the film. This invention further relates to a program for causing a computer to make such measurements.

2. Description of the Related Art

It has been common practice to measure the thickness of a film formed on multilayer wiring or a step in the film after calibrating the spectral characteristic of the hardware of the optical system, with an Si wafer as a reference. This method, however, has the following problems: it requires a very long time to do calculations because there are many parameters; and high-accuracy measurements cannot be made because there are many uncertain factors, including scattered light developed at the edge of the wiring, the shape of the wiring, and density.

For this reason, there has been a need to realize a film thickness measuring and a step height measuring method and a film thickness measuring apparatus which shorten the time required for calculations by decreasing the number of parameters necessary to measure the film thickness and step height and which make high-accuracy measurements by eliminating such uncertain factors as scattered light developing at the edge of the wiring, the shape of the wiring, and density.

BRIEF SUMMARY OF THE INVENTION

According to a first aspect of the present invention, there is provided a film thickness measuring method comprising: projecting white light onto a wafer with a film to be measured and sensing a first reflected light intensity from the wafer for each wavelength; determining a value of the sensed first reflected light intensity for each wavelength in a form of a first light intensity profile with wavelength as an abscissa axis (x axis) and light intensity as an ordinate axis (y axis); projecting the white light onto a reference sample which has the same structure as that of an underlying layer below a film to be measured of the wafer and sensing a second reflected light intensity from the reference sample for each wavelength; determining a value of the second reflected light intensity for each wavelength in a form of a second light intensity profile with wavelength as the abscissa axis and light intensity as the ordinate axis; calculating a normalized light intensity profile by dividing the first light intensity profile by the second light intensity profile; and calculating the film thickness of the film to be measured from the normalized light intensity profile.

According to a second aspect of the present invention, there is provided a step height measuring method comprising: projecting white light onto a wafer with a film to be measured whose surface is uneven and sensing a first reflected light intensity from the wafer for each wavelength; determining a value of the sensed first reflected light intensity for each wavelength in a form of a first light intensity profile with wavelength as an abscissa axis and light intensity as an ordinate axis; projecting the white light onto a reference sample which has the same structure as that of an underlying layer below a film to be measured of the wafer and sensing a second reflected light intensity from the reference sample for each wavelength; determining a value of the second reflected light intensity for each wavelength in a form of a second light intensity profile with wavelength as the abscissa axis and light intensity as the ordinate axis; calculating a normalized light intensity profile by dividing the first light intensity profile by the second light intensity profile; and calculating a step height in the film to be measured from the normalized light intensity profile.

According to a third aspect of the present invention, there is provided a semiconductor device manufacturing method comprising: forming a film to be measured on a wafer; projecting white light onto the wafer with the film to be measured and sensing a first reflected light intensity from the wafer for each wavelength; determining a value of the sensed first reflected light intensity for each wavelength in a form of a first light intensity profile with wavelength as an abscissa axis and light intensity as an ordinate axis; projecting the white light onto a reference sample which has the same structure as that of an underlying layer below a film to be measured of the wafer and sensing a second reflected light intensity from the reference sample for each wavelength; determining a value of the second reflected light intensity for each wavelength in a form of a second light intensity profile with wavelength as the abscissa axis and light intensity as the ordinate axis; calculating a normalized light intensity profile by dividing the first light intensity profile by the second light intensity profile; calculating the film thickness of the film to be measured from the normalized light intensity profile; and, if the film thickness of the film to be measured meets a process specification, proceeding to the next process, whereas if the film thickness does not meet the process specification, reexamining a condition for manufacturing the film to be measured.

According to a fourth aspect of the present invention, there is provided a film thickness measuring apparatus comprising: a lighting optical system which causes a convergent lens to converge and project white light from a white light source onto a wafer with a film to be measured; a sensor which senses a reflected light intensity from the wafer obtained as a result of the projection of the white light, for each wavelength via a spectroscope; and a computer which calculates a film thickness of the film to be measured, from the sensed reflected light intensity, wherein the computer determines and records the value of the reflected light intensity for each wavelength in a form of a first light intensity profile with wavelength as an abscissa axis and light intensity as an ordinate axis, uses the lighting optical system and the sensor to calculate and record in a form of a second light intensity profile the reflected light intensity from a reference sample which has the same structure as that of an underlying layer below the film to be measured, calculates a normalized light intensity profile by dividing the first light intensity profile by the second light intensity profile, and calculates a film thickness of the film to be measured from the normalized light intensity profile.

According to a fifth aspect of the present invention, there is provided a computer program recorded on a computer-readable medium, configured to measure a film thickness of a film to be measured on a wafer, the computer program comprising: projecting white light onto a wafer with a film to be measured and sensing a first reflected light intensity from the wafer for each wavelength; determining a value of the sensed first reflected light intensity for each wavelength in a form of a first light intensity profile with wavelength as an abscissa axis and light intensity as an ordinate axis; projecting the white light onto a reference sample which has the same structure as that of the underlying layer below the film to be measured of the wafer and sensing a second reflected light intensity from the reference sample for each wavelength; determining a value of the second reflected light intensity for each wavelength in a form of a second light intensity profile with wavelength as the abscissa axis and light intensity as the ordinate axis; calculating a normalized light intensity profile by dividing the first light intensity profile by the second light intensity profile; and calculating a film thickness of the film to be measured from the normalized light intensity profile.

BRIEF DESCRIPTION OF THE SEVERAL VIEWS OF THE DRAWING

FIG. 1 is a sectional view of a wafer applied to a first embodiment of the present invention;

FIG. 11 shows a comparison between the result of measuring a step height in the second embodiment and the result of measurements by SEM.

DETAILED DESCRIPTION OF THE INVENTION

Figure 2:
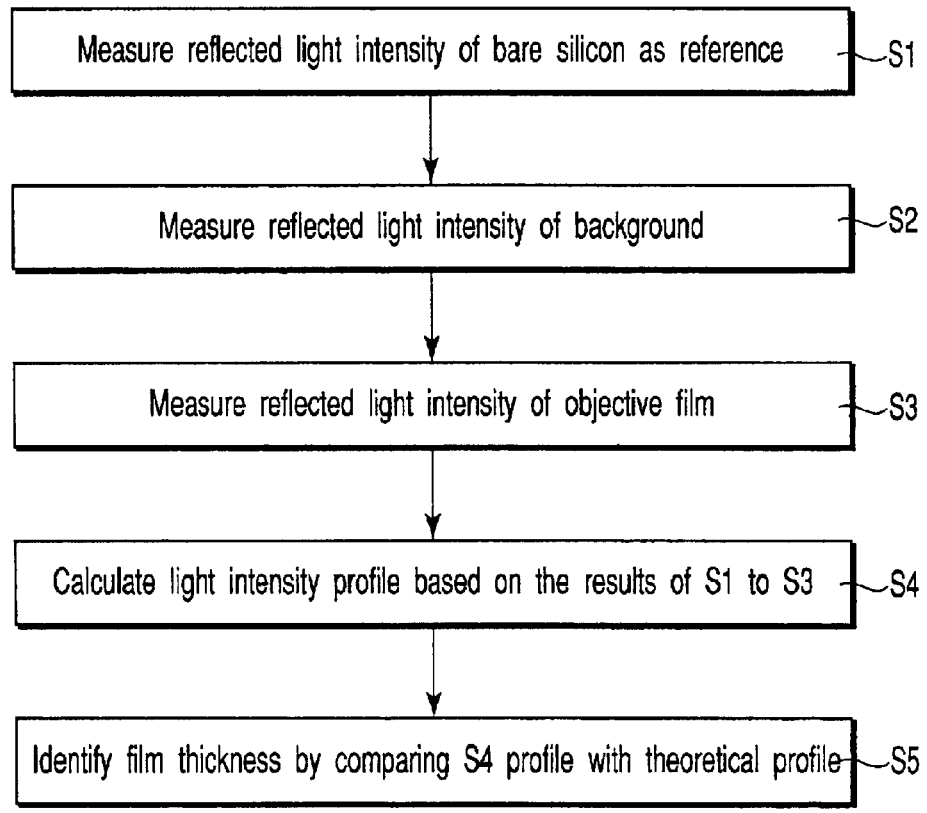
FIG. 2 is a flowchart to help explain the procedure for measuring a film thickness in a conventional method.

Before explanation of embodiments of the present invention, a conventional method of measuring a film thickness or a step height in the semiconductor manufacturing processes will be explained.

In the semiconductor manufacturing processes, various thin films are formed on an Si wafer. FIG. 1 shows an example of forming a three-layer structure of an oxide film 105, a metal film 104, and an insulating film 103 on an Si wafer 107, and thereafter forming metal wiring 102 above these layers via an interlayer insulating film 106, and further forming a thin film (or a film to be measured) 101 on the metal wiring.

The film thickness W on the multilayer wiring as shown in FIG. 1 has formerly been measured as follows. First, in the procedure (step S1 to step S4) shown in FIG. 2, a light intensity profile is calculated.

(Step S1)

As a reference, the reflected light intensity of a bare silicon wafer is measured. Specifically, white light is projected on an Si wafer to be measured. Then, the intensity of the reflected light from the Si wafer is sensed for each wavelength. The sensed reflected light intensity is recorded in a computer in the form of a light intensity profile Iref ($\lambda$) with wavelength as the abscissa axis and light intensity as the ordinate axis.

(Step S2)

The light intensity of the background is measured. Specifically, with the shutter of the sensing system closed, the reflected light intensity of diffused reflection occurring in the optical system is measured in the form of a background light intensity profile Ibg ($\lambda$) in the same manner as in step S1.

(Step S3)

The light intensity of the wafer whose film thickness is to be measured is measured. Specifically, an oxide film is formed as a film 101 to be measured on the multilayer wiring as shown in FIG. 1. A reflected light intensity profile Ispl ($\lambda$) of a sample of the oxide film whose film thickness is to be measured is measured in the same manner as in step S1.

(Step S4)

Using the light intensity profiles obtained in step S1 to step S3, Ibg ($\lambda$) is eliminated from Isp ($\lambda$) and a light intensity profile Ref ($\lambda$) of the film to be measured is calculated by using Isp ($\lambda$), Ibg ($\lambda$) and Iref ($\lambda$).

Next, the film thickness of (or step in) the film 101 to be measured is calculated in the following step S5.

(Step S5)

The measured value is calculated from the light intensity profile Ref ($\lambda$) recorded in step S4. Specifically, a theoretical light intensity profile is obtained in a specific film thickness (or step) range t of t0 to t1 and the light intensity profiles measured in step S1 to step S3 are compared with a theoretical light intensity profile. The theoretical light intensity profile is calculated according to the following procedure explained in item (1) to item (6):

(1) The optical constants of the respective films 101 to 106 and Si wafer 107 are determined in advance. These optical constants are obtained from, for example, the values written in the related literature. Alternatively, a sample of a single layer film is formed separately and the reflected light intensity profile from the sample is analyzed, thereby determining the optical constants.

(2) The interlayer insulating film 106 and oxide film 105 form a mixed layer. The optical constant of the interlayer insulating film 106 is mixed with that of the oxide film 105 in a specific ratio to form a new layer X. The optical constant of the layer X is then calculated. For example, for the mixing ratio $f=f_X$, the following equation is set up:

Refractive index $n_X$ of layer $X = f_X \times n_{106} + (1-f_X) \times n_{105}$ (3) The optical constant of the interlayer insulating film 106 is mixed with that of the metal film 104 in a specific ratio to form a new layer Y with a refractive index of $n_Y$ by the same approach as in item (2). The optical constant of the layer Y is then calculated.

(4) The optical constant of the interlayer insulating film 106 is mixed with that of the insulating film 103 in a specific ratio to form a new layer Z with a refractive index of $n_Z$ by the same approach as in item (2). The optical constant of the layer Y is then calculated.

(5) The optical constant of the interlayer insulating film 106 is mixed with that of the metal wiring 102 in a specific ratio to form a new layer W with a refractive index of $n_W$ by the same approach as in item (2). The optical constant of the layer W is then calculated.

(6) A theoretical light intensity profile $I_{the}$ when the light reflected from the Si wafer 107 passes through layer X→layer Y→layer Z→interlayer insulating film 106→layer W→the film 101 to be measured in this order is determined using the refractive indexes $n_X$, $n_Y$, $n_Z$, and $n_W$ and the film thicknesses $t_X$, $t_Y$, $t_Z$, and $t_W$ as input parameters.

Figure 3:
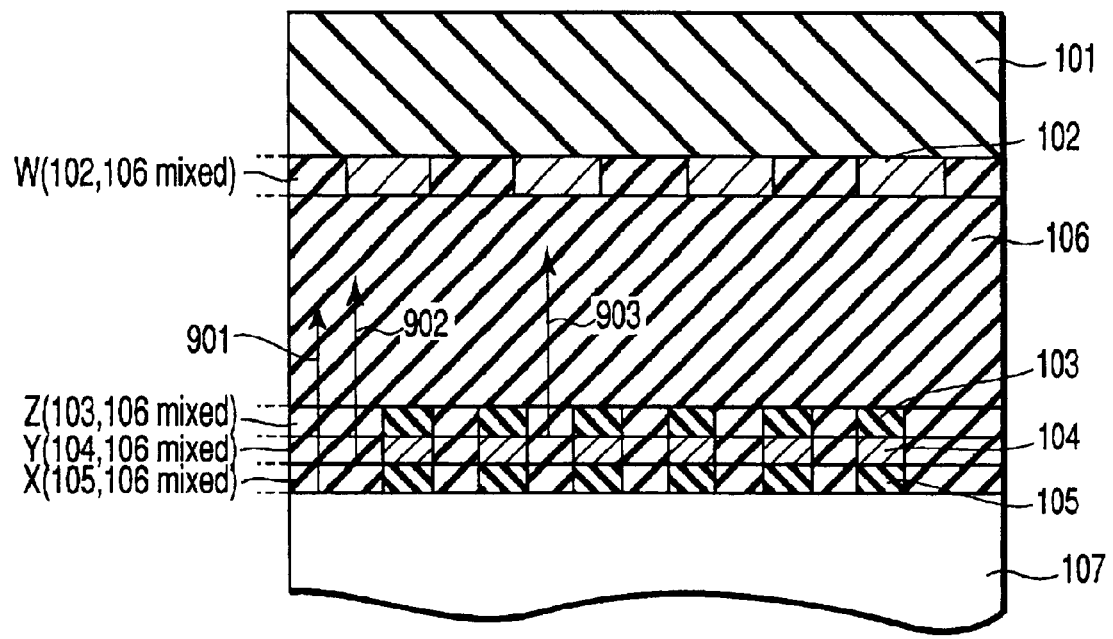
FIG. 3 shows reflected light at each layer in a multilayer structure.

At this time, the theoretical light intensity profile $I_{the}$ of the multilayer film is determined according to the following items (a) to (d):

(a) If the refractive index of the Si substrate is $n_{si}$, the reflected light 901 from the substrate surface, or $r_{si}$, in FIG. 3 is determined by the following equation:

$$r_{si} = \frac{n_{si} - n_x}{n_{si} + n_x} \quad (1)$$

(b) $r_{si}$, the reflected light 901 in item (a), passes through the mixed film X (with a film thickness of $t_X$ and a refractive index of $n_X$) of the interlayer insulating film 106 and oxide film 105 and interferes with $r_X$ developing at the interface between the mixed film Y of the metal film 104 and interlayer insulating film 106 and the mixed film X, with the result that the reflectivity r of the interference light is calculated as follows:

$$r = \frac{r_{si} + r_x \cdot \exp(-4\pi i n_x t_x / \lambda)}{1 + r_{si} \cdot r_x \cdot \exp(-4\pi i n_x t_x / \lambda)} \quad (2)$$

(c) The interference light r in item (b) passes through the mixed film Y (with a film thickness of $t_Y$ and a refractive index of $n_Y$) of the metal film 104 and interlayer insulating film 106 and interferes with $r_Y$ developing at the interface between the mixed film Z of the insulating film 103 and interlayer insulating film 106 and the mixed film Y, with the result that the reflectivity r' of the interference light is calculated in the same manner as in item (b).

(d) From this point on, the calculation in item (b) is repeated until the interference light has passed through the film 101 to be measured, thereby calculating the theoretical light intensity profile $I_{the}$ of the multilayer film.

The light intensity profile $I_{the}$ in item (6) is determined for all of the following ranges of the mixing ratios $f_X$, $f_Y$, $f_Z$, and $f_W$ in item (5) specified in item (2): $f_X=0$ to 1, $f_Y=0$ to 1, $f_Z=0$ to 1, and $f_W=0$ to 1, and for all of the following film thickness ranges: $t_X=t_{X0}$ to $t_{X1}$, $t_Y=t_{Y0}$ to $t_{Y1}$, $t_Z=t_{Z0}$ to $t_{Z1}$, $t_W=t_{W0}$ to $T_{W1}$, and the film thickness to be measured $t=t_0$ to $t_1$.

The theoretical light intensity profile $I_{the}$ (λ) of the multilayer film with a refractive index and a film thickness in those specific ranges is compared with the Ref (λ) measured in steps S1 to S4. The film thickness t to be measured, the mixing ratios $f_X$, $f_Y$, $f_Z$, and $f_W$ of the individual layers, and the film thickness ranges $t_X$, $t_Y$, $t_Z$, and $t_W$ where the difference between theoretical light intensity profile $I_{the}$ (λ) and Ref (λ) becomes smallest are calculated as the values to be measured.

Figure 4:
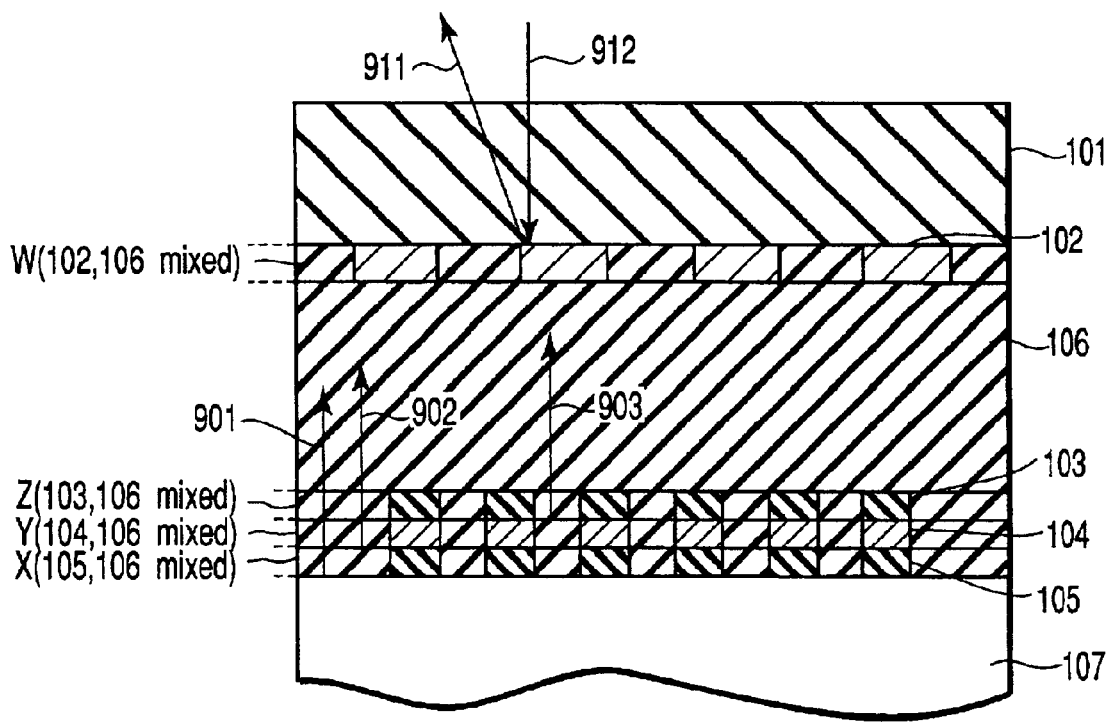
FIG. 4 schematically shows scattered light developing at the edge of metal wiring.

The above-described conventional techniques have the following problem: since there are a lot of parameters, it takes an extremely long time to do calculations. Specifically, five film thickness values ($t_X$, $t_Y$, $t_Z$, $t_W$, t) and four mixing ratios ($f_X$, $f_Y$, $f_Z$, $f_W$) that is, a total of 9 parameters, are needed. Furthermore, since there are many uncertain factors, including scattered light developing at the edge portion of the wiring, the shape of the wiring, and density, high-accuracy measurements are impossible. For example, as shown in FIG. 4, light 912 entering at right angles is scattered at the edge portion of the metal wiring 102, with the result that scattered light has light 911 which cannot be sensed by the detector.

Therefore, in the semiconductor manufacturing processes, the film thickness measurement of the multilayer wiring structure shown in FIG. 1 is impracticable. Presently, the conditions for the film thickness are determined and its management are made using a test piece wafer (a sample with a film to be measured being formed on a bare silicon). However, use of the test piece wafer causes the problem of increasing the cost and lowering the productivity.

As described above, in the semiconductor manufacturing processes, it is common practice to optically measure the film thickness after calibrating the spectral characteristic of the hardware of the optical system using an Si wafer as a reference. However, when the film thickness on the multi-layer wiring and the step in the film are measured, it is almost impossible to model all of the wiring structure above the Si wafer and measure the film thickness and step height with high accuracy and high throughput.

In the embodiments explained below, a wafer whose structure is below the film to be measured is used as a sample serving as a reference, thereby not only decreasing the number of the necessary parameters for measuring the film thickness to shorten the time required to do calculations but also eliminating such uncertain factors as scattered light developing at the edge portion of the wiring, the shape of the wiring, and density. As a result, an intensity profile less affected by the multilayer wiring structure is obtained, which enables the film thickness to be measured easily with high accuracy. This method may be applied similarly to the measurement of a step height formed on the multilayer wiring.

(First Embodiment)

A first embodiment of the present invention relates to a method of measuring a film thickness on a multilayer wiring substrate with high accuracy.

FIG. 1 shows a wafer sectional structure applied to the first embodiment. On an Si wafer 107, a three-layer structure of a silicon oxide film 105, a metal film 104, and an insulating film 103 is partially formed. On the three-layer structure and above the Si wafer 107, an interlayer insulating film 106 is formed. At the surface portion of the interlayer insulating film 106, a metal layer wiring 102 is formed in an embedded manner. On these, a film 101 to be measured, such as a silicon oxide film, is formed.

The metal wiring 102 is arranged in a line-and-space manner, with its pitch being sufficiently shorter (equal to or less than λ/4) than a wavelength of λ. This is because the measurement light is caused to pass through with greater difficulty, which allows the surface of the interlayer insulating film 106 including the metal wiring 102 to be treated as a single substrate surface.

Figure 5:
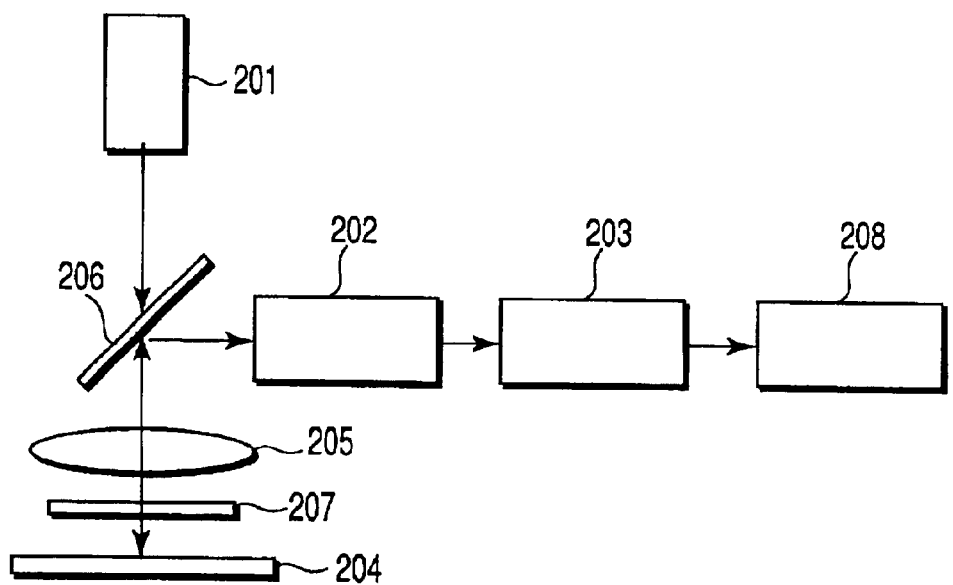
FIG. 5 schematically shows the configuration of a film thickness measuring apparatus used in the first embodiment.

FIG. 5 schematically shows the configuration of a film-thickness measuring apparatus used in the first embodiment. Numeral 201 indicates a white light source which emits white light, 202 a spectroscope, 203 detector, 204 a wafer, 205 a condenser lens, 206 a half mirror, 207 a shutter, and 208 a computer.

The white light from the light source 201 passes through the half mirror 206 and is gathered by the condenser lens 205, which projects the light onto the surface of the wafer 204. The reflected light (or interference light) from the wafer 204 as a result of the projection of the light is directed to the spectroscope 202 via the condenser lens 205 and half mirror 206. Then, the light split at the spectroscope 202 is sensed by the detector 203. As a result of the sensing, the computer 208 records the values of the light intensity for each sensed waveform in the form of a light intensity profile with wavelength as the abscissa axis and light intensity as the ordinate axis.

In addition to the above process, the computer 208 records a light intensity profile of the wafer to be measured, together with a light intensity profile of a sample serving as a reference, performs normalization by dividing the light intensity profile of the wafer to be measured by the light intensity profile of the reference sample, and calculates the thickness of the film to be measured, from the normalized light intensity profile.

Figure 6:
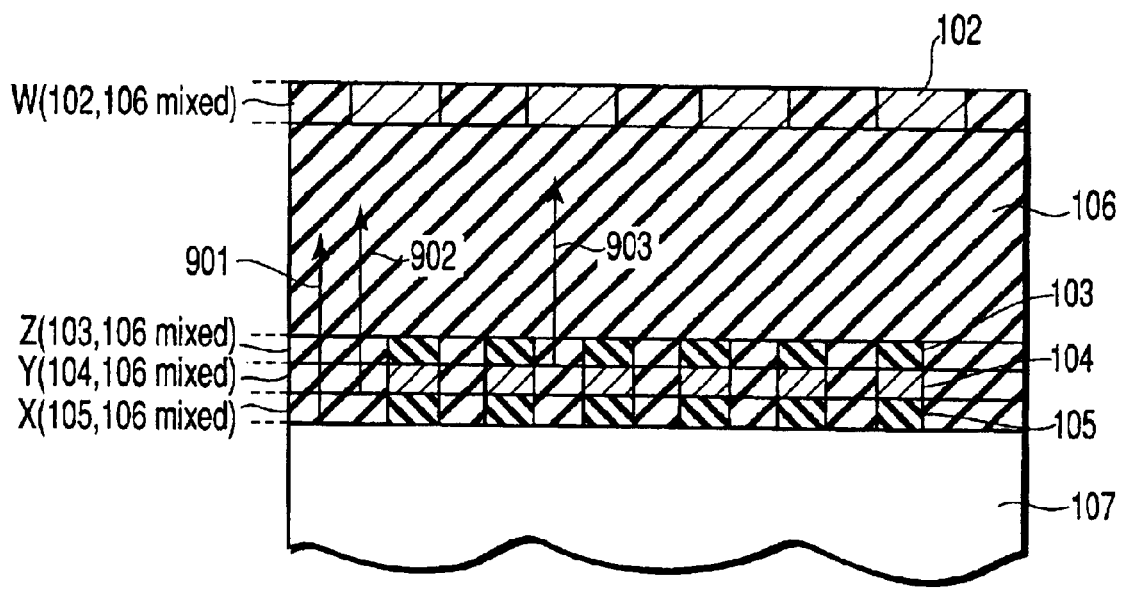
FIG. 6 shows a sectional structure of a wafer (or reference) used in the first embodiment.

FIG. 6 shows a sectional structure immediately before the formation of the oxide film 101 in FIG. 1. Let a sample with this structure be a reference.

Figure 7:
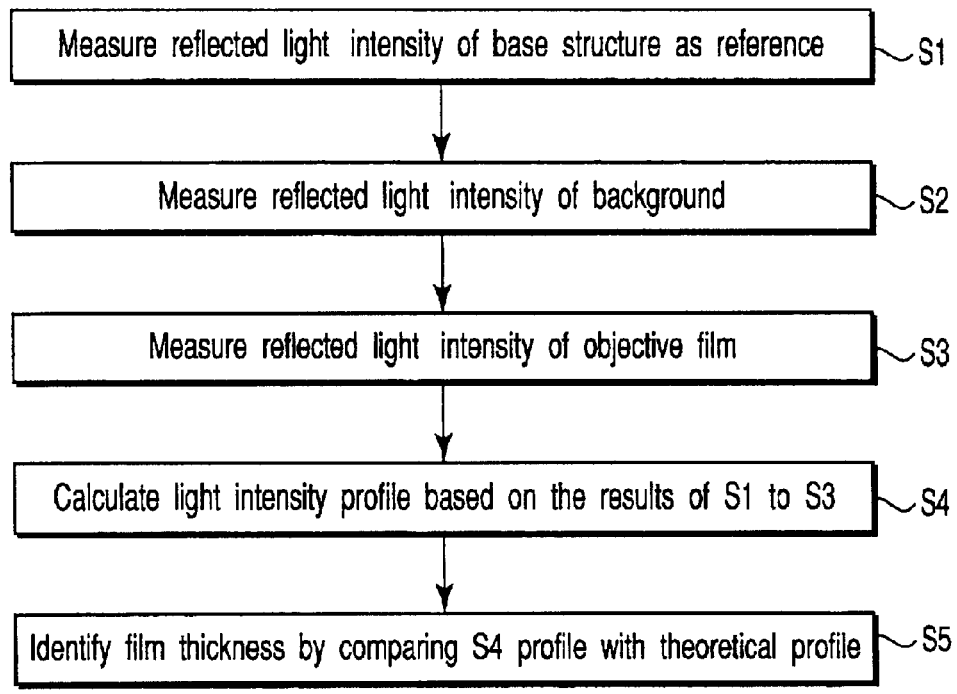
FIG. 7 is a flowchart to help explain the procedure of measuring a film thickness in the first embodiment.

Next, a method of measuring the thickness of the silicon oxide film on the multilayer wiring as shown in FIG. 1 will be explained. First, the light intensity profile is calculated according to the procedure (from step S1 to step S4) shown in FIG. 7.

(Step S1)

A reference wafer with a wiring structure is measured. As described in the prior art, it is common practice to use an Si wafer as a reference. In the first embodiment, however, a sample with a sectional structure (the structure shown in FIG. 6) immediately before the formation of the film 101 to be measured in FIG. 1 is used as a reference. This sample is placed gently in the position of the wafer 204 of FIG. 5. Then, a light intensity profile $I_{ref}(\lambda)$ is calculated according to the following procedure:

(1-1) Project the white light from the light source 201 onto the wafer 204 to be measured, or the reference wafer having the above-mentioned structure in this case.

(1-2) Sense the reflected light intensity from the wafer 204 for each wavelength via the spectroscope 202 by the detector 203.

(1-3) Record the reflected light intensity sensed at the detector 203 in the form of a light intensity profile $I_{ref}(\lambda)$ with wavelength as the abscissa axis and light intensity as the ordinate axis.

(Step S2)

The reflected light from the background is measured. Specifically, with the shutter 207 closed in FIG. 5, let a light intensity profile of diffused reflection developing in the optical system be a background light intensity profile $Ibg(\lambda)$. Then, the background light intensity profile $Ibg(\lambda)$ is measured in the same manner as in step S1.

(Step S3)

The wafer whose film thickness is to be measured in FIG. 1 is measured. The wafer whose film thickness is to be measured is such that a silicon oxide film 101 to be measured has been formed on the structure of FIG. 6. This sample is measured in the same manner as in step S1, thereby determining a reflected light intensity profile $Ispl(\lambda)$.

(Step S4)

Conversion into a normalized light intensity profile is performed. The light intensity profiles determined in step S1 to step S3 are substituted into the following equation, thereby calculating a normalized light intensity profile $Ref(\lambda)$:

$$Ref(\lambda)=(Ispl(\lambda)-Ibg(\lambda))/(Iref(\lambda)-Ibg(\lambda)) \quad (3)$$

Next, the value of the film thickness will be determined in step S5.

(Step S5)

The measured value is calculated from the normalized light intensity profile $Ref(\lambda)$ determined in step S1 to step S4 according to the following procedure:

(5-1) Determine a theoretical light intensity profile $S_{im}(\lambda)$ in a specific film thickness (or step) range t of t0 to t1.

(5-2) Compare the normalized light intensity profile $Ref(\lambda)$ measured in step S4 with the theoretical light intensity profile $S_{im}(\lambda)$ in a specific film thickness (or step) range t of t0 to t1 in step (5-1). This is done to determine t=t where the difference between them becomes smallest, to be the measured value as described later.

The theoretical light intensity profile $S_{im}(\lambda)$ can be expressed as $S_{im}(\lambda)=|r_{fin}|^2$, if the reflectivity at the surface of the oxide film to be measured is $r_{fin}$. The reflectivity $r_{fin}$ can be determined from the refractive index of each part as described later. Therefore, the refractive index of each part is determined first. An actual calculating method is as follows:

(5-2-1) Determine the optical constant (or refractive index) of the silicon oxide film 101 to be measured. A method of determining the optical constant is (1) to refer to the values written in the related literature, or (2) to separately form a sample of a single layer film and analyze the normalized light intensity profile of the sample according to the following procedure, while comparing the profile with the theoretical light intensity profile:

In this case, a) the refractive index of the film whose optical constant is to be measured is expressed by the following equation:

$$n = 1 + \frac{qe}{2\varepsilon 0 m}\sum_{k}\frac{Nk}{\omega k^2 - \omega^2 + i\gamma k\omega} \quad (4)$$

where $q_e$ is the amount of charge of an electron, $\epsilon_0$ is the permittivity of vacuum, and m is the mass of an electron, each of which is a known constant. Using the atomic density $N_k$, the resonance frequency $\omega_k$, the attenuation constant $\gamma_k$ of vibration, and the film thickness t as parameters excluding the constants, n at which the difference between the normalized light intensity profile of the single layer film and the theoretical light intensity profile becomes smallest is determined.

b) Alternatively, n at which the difference between the normalized light intensity profile of the single layer film and the theoretical light intensity profile becomes smallest is determined using $n_0$, $n_2$, $n_4$, and the film thickness t as parameters in the following equation:

$$n=n_0+(n_2/\lambda)^2+(n_4/\lambda)^4 \quad (5)$$

(5-2-2) The entire structure including the metal wiring 102, interlayer insulating film 106, and Si wafer 107 etc. in FIG. 6 is regarded as a single "substrate". Then, the optical constant $n_{int}$ of this "substrate" is determined by approximating the actually measured light intensity profile of the structure in FIG. 6. A method of determining the optical constant $n_{int}$, which is also a method of determining the optical constant and the value of the film thickness simultaneously, is as follows.

(1) The refractive index of the film whose optical constant is to be measured is expressed as equation (4). The reflectivity $r_{int}$ of the reflected light is calculated from the refractive index $n_{int}$ of the substrate and the refractive index $n_{OX}$ of the oxide film 101 determined in (5-2-2):

$$r_{int} = \frac{n_{int} - n_{ox}}{n_{int} + n_{ox}} \quad (6)$$

The reflected light $r_{int}$ passes through the layer with a film thickness of t and a refractive index of $n_{OX}$ and interferes with the reflected light $r_{sec}$ at the surface of the silicon oxide film 101, thereby allowing calculation of the reflected light $r_{fin}$:

$$r_{fin} = \frac{r_{int} + r_{ox} \cdot \exp(-4\pi i n_{ox} t/\lambda)}{1 + r_{int} \cdot r_{ox} \cdot \exp(-4\pi i n_{ox} t/\lambda)} \quad (7)$$

where the atomic density $N_k$, the resonance frequency $\omega_k$, the attenuation constant $\gamma_k$ of vibration, and the film thickness t are used as parameters. The theoretical light intensity profile $S_{im}(\lambda)=|r_{fin}|^2$ at each value in the range of the parameters is compared with the measured light intensity profile determined with the Ref ($\lambda$). Then, the value of a parameter at which the difference between them is smallest is determined. Let the determined value be the optical constant of the substrate part.

(2) Alternatively, let $n_0$, $n_2$, $n_4$ in equation (5) be parameters. The reflected light $r_{int}$ from the substrate is calculated from the refractive index $n_{int}$ of the substrate and the refractive index $n_{OX}$ of the silicon oxide film 101 determined in item (5-2-1) using equation (6).

The reflected light $r_{int}$ passes through the layer with a film thickness of t and a refractive index of $n_{OX}$ and interferes with the reflected light $r_{sec}$ at the surface of the silicon oxide film 101, thereby allowing calculation of the reflected light $r_{fin}$ using equation (7).

(5-3) Using the optical constant determined in step (5-2), the measured normalized light intensity profile Ref ($\lambda$) is compared with the theoretical light intensity profile $S_{im}(\lambda)$ in the range t of t0 to t1 in step (5-1). Then, t=t at which the difference between them becomes smallest is calculated as the measured value. This enables the thickness of the oxide film 101 formed on the multilayer wiring layer to be measured.

The first embodiment has the following advantages as compared with the prior art equivalent and can solve the problems in the prior art.

First, the number of parameters can be decreased remarkably as compared with the prior art equivalent. In the structure of FIG. 1, there are a total of nine parameters in the prior art, whereas there is only one parameter, the film thickness value of the film 101 to be measured, in the first embodiment.

Using, as a reference, a whole of a wafer with a wiring structure which includes such uncertain factors as scattered light developing at the edge portion of the wiring, the shape of the wiring, and density, enables calibration.

Figure 8:
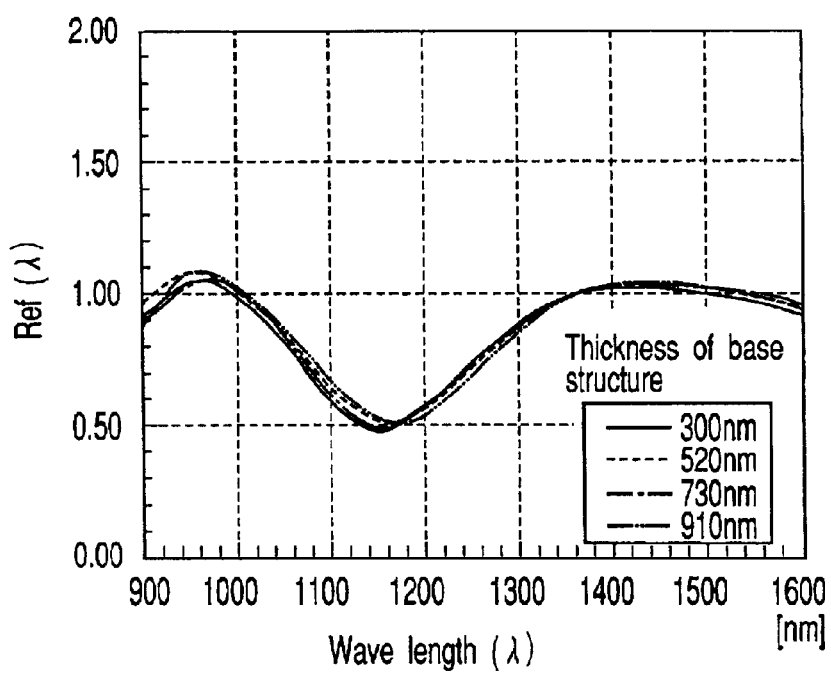
FIG. 8 shows a normalized light intensity profile when a sample with a structure of FIG. 1 is measured by the method of the first embodiment.

1) In the first embodiment, four kinds of samples were used: they had a silicon oxide film 101 with a thickness of 950 nm and a structure (or base structure) composed of a layer W including wiring 102 and the underlying layers with a film thickness of 300, 520, 730, and 910 nm, respectively in FIG. 1. FIG. 8 shows the result of measuring the normalized light intensity profile Ref ($\lambda$) using the structure of FIG. 1 excluding the silicon oxide film 101, or the structure of FIG. 6, as a reference sample. It is seen from FIG. 8 that the spectrum does not depend on the value of the film thickness of the base structure.

Therefore, in the first embodiment, a theoretical equation has only to be set up using the parameters related to the oxide film 101 at the top layer.

Figure 9:
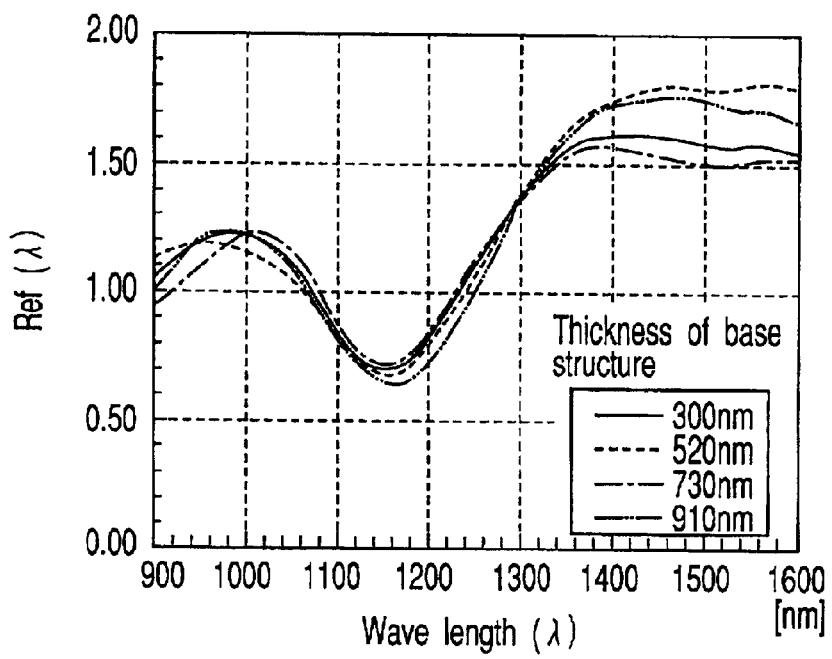
FIG. 9 shows a normalized light intensity profile when a sample with a structure of FIG. 1 is measured by a conventional method.

2) For reference, FIG. 9 shows a normalized light intensity profile in an example of using a bare silicon substrate as a reference explained in the prior art.

It is seen from FIG. 9 that the intensity profile is influenced by the film thickness of the interlayer insulating film 106. If this is dealt with theoretically, there are nine parameters except the film thickness of the silicon oxide film 101, including the items below, even in a method of treating the wiring part, the simplest model, as a mixed layer:
1. The film thickness of the interlayer insulating film 106 between the Si wafer 107 and the metal wiring 102
2. The mixing ratio of the metal wiring 102 to the interlayer insulating film 106
3. The thickness of the metal wiring 102
4. The film thickness of the oxide film 101
5. The film thicknesses of other films and the mixing ratio of the layers X, Y and Z.

In addition, such error factors as the shape of the sectional structure and density are expected to be great.

In the first embodiment, use of a wafer with the structure below the wiring as a reference enables a theoretical light intensity profile to be modeled easily. This makes it possible to measure the film thickness with high accuracy and high throughput, even when there are such uncertain factors as scattered light developing at the edge portion of the wiring, the shape of the wiring, and density.

(Second Embodiment)

Figure 10:
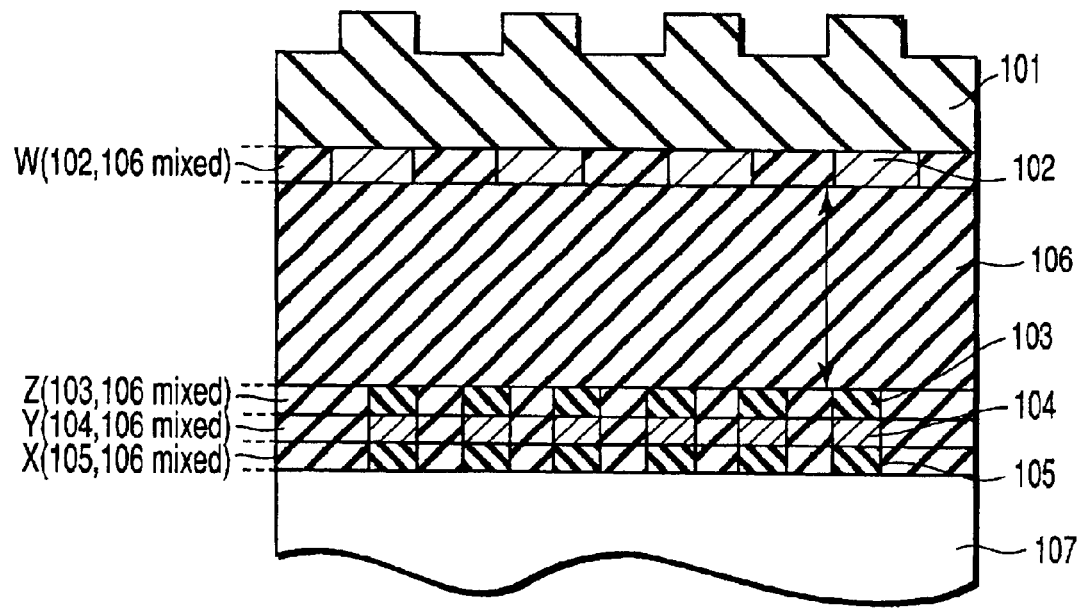
FIG. 10 is a sectional view of a wafer applied to a second embodiment of the present invention.

This method may be applied not only to measuring the film thickness of a film whose top layer portion is flat but also to measuring a step in a sample with a step structure as shown in FIG. 10. The sample of FIG. 6 is used as a reference. The region from the wiring structure including the metal wiring 102 and interlayer insulating film 106 to the Si wafer 107 is considered to be a single substrate. The optical constant of the single substrate is determined in advance.

When the wavelength is equal to or shorter than the pattern dimension, there are two types of light passing through the recessed portion and projecting portion of the pattern. The step can be calculated using a model where interference light develops because of the phase difference between the two types of light. When a wavelength longer than the pattern dimension is used, the light reflected from the substrate surface cannot allow recognition of the unevenness of the pattern. The step can be calculated using a model where the light passes through a layer whose optical constant lies between that of air and that of the oxide film. The second embodiment relates to the latter method of using a long wavelength.

FIG. 11 shows its result, with the measured values of a sectional step height by SEM as the abscissa axis and the values of the step calculated by this method as the ordinate axis. They coincide with the sectional SEM measured values with an accuracy of ±5% (shown by dotted lines in FIG. 11), which proves an effective step height measuring method.

As described above, this method enables the film thickness and step height on the multilayer wiring to be measured with high accuracy and high throughput, which eliminates the need to use a test piece wafer attributable to an increase in the cost and a decrease in the productivity.

While in the second embodiment, the measurement of the film thickness of the oxide film formed on the multilayer wiring and the measurement of the step height on the multilayer wiring have been explained, the present method may be applied not only to the measurement of the oxide film but also to the measurement of various types of thin films. Furthermore, the underlying layer is not limited to the multilayer wiring and may be applied to a suitably modified wiring structure. In addition, the configuration of the measuring apparatus is not limited to FIG. 5 and may be modified suitably according to the specification.

The method described in the second embodiment may be written to a recording medium, such as a magnetic disk (e.g., floppy disk or hard disk), an optical disk (e.g., CD-ROM or DVD), or a semiconductor memory, in the form of programs executable on a computer. Then, the recording medium may be applied to various types of devices. Alternatively, the method may be transmitted in the form of programs executable on a computer by way of a communicating medium. Then, the programs may be applied to various types of devices.

As described in detail, the present invention provides the technique for measuring the film thickness of a film or the step height on multilayer wiring in semiconductor manufacturing processes in a nondestructive manner with high accuracy and high throughput. In this method, the film thickness of a product wafer is measured and, depending on the measured value, it is determined whether to proceed to the next step or to reexamine the manufacturing conditions. As a result, the characteristics of the device and the yield are improved remarkably.

Furthermore, there is no need to put a test piece wafer independently on the manufacturing line, which decreases the number of wafers used. Consequently, when the present invention is applied to semiconductor manufacturing processes, it contributes much to an increase in the efficiency of the production line and a decrease in the production cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A film thickness measuring method comprising:
   preparing a wafer with a film to be measured, which is made in such a manner that a multilayer metal wiring structure is formed on a base wafer, said multilayer metal wiring structure including a metal wiring and an interlayer insulating film, and said film to be measured is formed on said multilayer metal wiring structure;
   preparing a reference sample of the same wafer as said wafer including said multilayer metal wiring structure formed on said base wafer and without said film to be measured;
   projecting white light onto said wafer with said film to be measured and sensing a first reflected light intensity from said wafer for each wavelength;
   determining a value of said sensed first reflected light intensity for each wavelength in a form of a first light intensity profile with wavelength as an abscissa axis and light intensity as an ordinate axis;
   projecting said white light onto said reference sample and sensing a second reflected light intensity from said reference sample for each wavelength;
   determining a value of said second reflected light intensity for each wavelength in a form of a second light intensity profile with wavelength as the abscissa axis and light intensity as the ordinate axis;
   calculating a normalized light intensity profile by dividing said first light intensity profile by said second light intensity profile; and
   calculating a film thickness of said film to be measured from said normalized light intensity profile, wherein, by regarding said reference sample including said multilayer metal wiring structure as a single substrate, a theoretical light intensity profile for said single substrate is calculated using a theoretical film thickness as a parameter, and by comparing said theoretical light intensity profile with said normalized light intensity profile, a theoretical film thickness at which a difference between said theoretical light intensity profile and said normalized light intensity profile becomes smallest is identified as said film thickness of said film to be measured.

2. The film thickness measuring method according to claim 1, wherein said reference sample is prepared in the same manner as said wafer is prepared.

3. The film thickness measuring method according to claim 1, wherein said calculating a theoretical light intensity profile includes determining an optical constant of said substrate from a known physical model or mathematical approximation.

4. A step height measuring method comprising:
   preparing a wafer with a film to be measured, which is made in such a manner that a multilayer metal wiring structure is formed on a base wafer, said multilayer metal wiring structure including a metal wiring and an interlayer insulating film, and said film to be measured is formed on said multilayer metal wiring structure;
   preparing a reference sample of the same wafer as said wafer including said multilayer metal wiring structure formed on said base wafer and without said film to be measured;
   projecting white light onto said wafer with said film to be measured whose surface is uneven and sensing a first reflected light intensity from said wafer for each wavelength;
   determining a value of said sensed first reflected light intensity for each wavelength in a form of a first light intensity profile with wavelength as an abscissa axis and light intensity as an ordinate axis;
   projecting said white light onto said reference sample and sensing a second reflected light intensity from said reference sample for each wavelength;
   determining a value of said second reflected light intensity for each wavelength in a form of a second light intensity profile with wavelength as the abscissa axis and light intensity as the ordinate axis;
   calculating a normalized light intensity profile by dividing said first light intensity profile by said second light intensity profile; and
   calculating a step height in said film to be measured from said normalized light intensity profile, wherein, by regarding said reference sample including said multilayer metal wiring structure as a single substrate, a theoretical light intensity profile for said single substrate is calculated using a theoretical step height as a parameter, and by comparing said theoretical light intensity profile with said normalized light intensity profile, a theoretical step at which a difference between said theoretical light intensity profile and said normalized light intensity profile becomes smallest is identified as said step height in said film to be measured.

5. The step height measuring method according to claim 4, wherein said reference sample is prepared in the same manner as said wafer is prepared.

6. The step height measuring method according to claim 4, wherein said calculating a theoretical light intensity profile includes determining an optical constant of said substrate from a known physical model or mathematical approximation.

7. A semiconductor device manufacturing method comprising:

preparing a wafer, which is made in such a manner that a multilayer metal wiring structure is formed on a base wafer, said multilayer metal wiring structure including a metal wiring and an interlayer insulating film;

preparing a reference sample of the same wafer as said wafer including said multilayer metal wiring structure formed on said base wafer;

forming a film to be measured on said wafer;

projecting white light onto said wafer with the film to be measured and sensing a first reflected light intensity from said wafer for each wavelength;

determining a value of said sensed first reflected light intensity for each wavelength in a form of a first light intensity profile with wavelength as an abscissa axis and light intensity as an ordinate axis;

projecting said white light onto said reference sample and sensing a second reflected light intensity from said reference sample for each wavelength;

determining a value of said second reflected light intensity for each wavelength in a form of a second light intensity profile with wavelength as the abscissa axis and light intensity as the ordinate axis;

calculating a normalized light intensity profile by dividing said first light intensity profile by said second light intensity profile;

calculating a film thickness of said film to be measured from said normalized light intensity profile, wherein, by regarding said reference sample including said multilayer metal wiring structure as a single substrate, a theoretical light intensity profile for said substrate is calculated using a theoretical film thickness as a parameter, and by comparing said theoretical light intensity profile with said normalized light intensity profile, a theoretical film thickness at which a difference between said theoretical light intensity profile and said normalized light intensity profile becomes smallest is identified as said film thickness of said film to be measured; and if said film thickness of said film to be measured meets a process specification, proceeding to a next process, whereas if said film thickness does not meet said process specification, reexamining a condition for manufacturing said film to be measured.

8. The semiconductor device manufacturing method according to claim 7, wherein said reference sample prepared in the same manner as said wafer is prepared.

9. The semiconductor device manufacturing method according to claim 7, wherein said calculating a theoretical light intensity profile includes determining an optical constant of said substrate from a known physical model or mathematical approximation.

10. A film thickness measuring apparatus comprising:

a lighting optical system which causes a convergent lens to converge and project white light from a white light source onto a wafer with a film to be measured, said wafer including a multilayer metal wiring structure formed on a base wafer, said multilayer metal wiring structure including a metal wiring and an interlayer insulating film;

a sensor which senses a reflected light intensity from said wafer obtained as a result of said projection of said white light for each wavelength via a spectroscope; and a computer which calculates a film thickness of said film to be measured from said sensed reflected light intensity, said computer determining and recording a value of said reflected light intensity for each wavelength in a form of a first light intensity profile with wavelength as an abscissa axis and light intensity as an ordinate axis, and using said lighting optical system and said sensor to calculate and record in a form of a second light intensity profile said reflected light intensity from a reference sample which is the same wafer as said wafer including said multilayer metal wiring structure formed on said base wafer and without said film to be measured, calculating a normalized light intensity profile by dividing said first light intensity profile by said second light intensity profile, and calculating a film thickness of said film to be measured from said normalized light intensity profile, wherein, by regarding said reference sample including said multilayer metal wiring structure as a single substrate, a theoretical light intensity profile for said substrate is calculated using a theoretical film thickness as a parameter, and by comparing said theoretical light intensity profile with said normalized light intensity profile, a theoretical film thickness at which a difference between said theoretical light intensity profile and said normalized light intensity profile becomes smallest is identified as said film thickness of said film to be measured.

11. The film thickness measuring apparatus according to claim 10, wherein said computer determines an optical constant of said substrate from a known physical model or mathematical approximation.

12. A computer program, recorded on a computer-readable medium and configured to measure a film thickness of a film to be measured on a wafer, said computer program comprising:

projecting white light onto a wafer with a film to be measured, said wafer including a multilayer metal wiring structure formed on a base wafer, said multilayer metal wiring structure including a metal wiring and an interlayer insulating film, and said film to be measured being formed on said multilayer metal wiring structure, and sensing a first reflected light intensity from said wafer for each wavelength;

determining a value of said sensed first reflected light intensity for each wavelength in a form of a first light intensity profile with wavelength as an abscissa axis and light intensity as an ordinate axis;

projecting said white light onto a reference sample which is the same wafer as said wafer including said multilayer metal wiring structure formed on said base wafer and without said film to be measured and sensing a second reflected light intensity from said reference sample for each wavelength;

determining a value of said second reflected light intensity for each wavelength in a form of a second light intensity profile with wavelength as the abscissa axis and light intensity as the ordinate axis;

calculating a normalized light intensity profile by dividing said first light intensity profile by said second light intensity profile; and calculating a film thickness of said film to be measured from said normalized light intensity profile, wherein, by regarding said reference sample including said multilayer metal wiring structure as a single substrate, a theoretical light intensity profile for said substrate is calculated using a theoretical film thickness as a parameter, and by comparing said theoretical light intensity profile with said normalized light intensity profile, a theoretical film thickness at which a difference between said theoretical light intensity profile and said normalized light intensity profile becomes smallest is identified as said film thickness of said film to be measured.

* * * * *